UNITED STATES PATENT OFFICE.

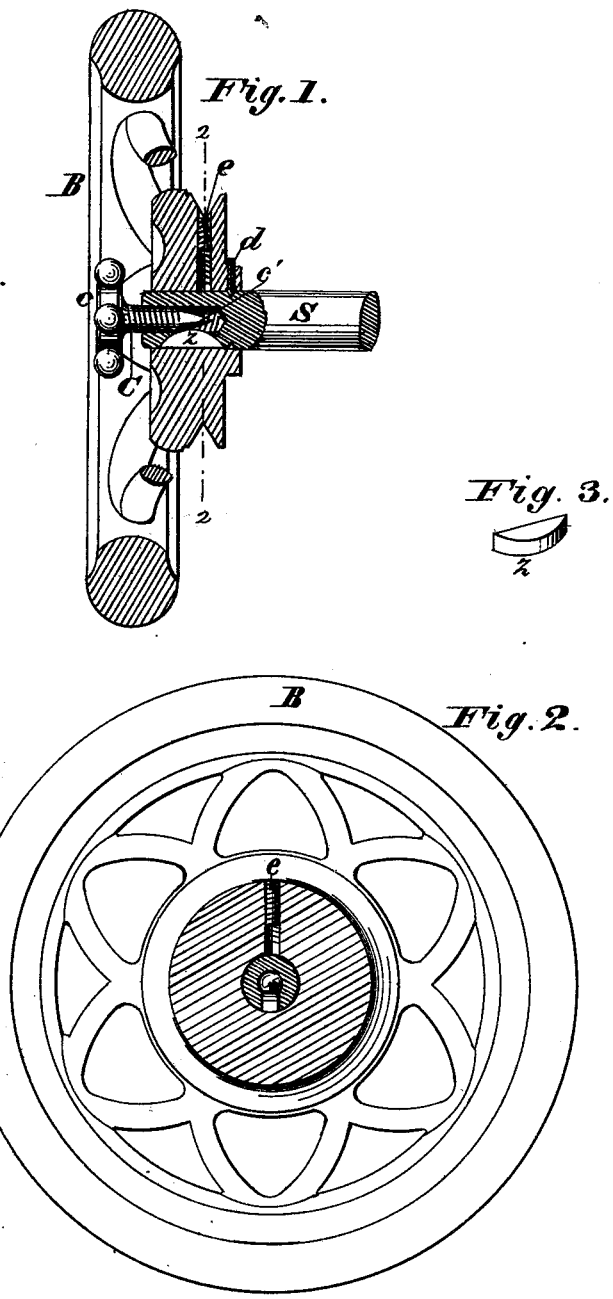

ROSWELL H. ST. JOHN, OF SPRINGFIELD, OHIO.

IMPROVEMENT IN PULLEY AND SHAFT CONNECTIONS.

Specification forming part of Letters Patent No. 187,929, dated February 27, 1877; application filed January 29, 1877.

*To all whom it may concern:*

Be it known that I, ROSWELL H. ST. JOHN, of Springfield, in the county of Clarke and State of Ohio, have invented a certain new and useful Improvement in Pulley and Shaft Connections, of which the following is a specification:

The object of my invention is to provide a ready means whereby a pulley or driving-wheel can be locked to its shaft, so as to drive the same, or may be disconnected, so as to run loosely thereon. To this end I employ an axial screw, which may be turned in or out of a central aperture in the end of the shaft, and when turned in will drive radially outward a locking-key, which is thus made to bear on the interior of the wheel-hub, and so lock it to the shaft.

The invention is especially applicable to sewing-machines, and is of great utility in providing instantaneous means of unlocking the driving-wheel from the shaft, so that it may run loosely thereon, and be used for driving a bobbin-winder, needle-sharpener, or other device, without running the sewing mechanism.

In the accompanying drawing, Figure 1 is a longitudinal section of the device as adapted for sewing-machines. Fig. 2 is a section of the wheel detached from the shaft. Fig. 3 is a detached view of the key.

S may represent the driving-shaft of a sewing-machine, and B the driving-wheel or pulley thereof. C is a screw fitting a threaded aperture coincident with the axis of the shaft. It is provided with a head, $c$, of any suitable construction, to adapt it to be readily turned in or out by means of the thumb and fingers. Its point has a conical or other tapering shape, as shown at $c'$. The wheel B is fitted on a cylindrical journal on its shaft, in which journal is formed a radial aperture to receive the key Z, the outer face of which is straight longitudinally and curved circumferentially, so as to coincide with the periphery of the journal on which the wheel B is fitted and turned. The back or inner face of the key Z has a convex shape, forming the arc of a circle, as represented; or it may consist of two inclined planes, converging to an apex. The hub of the wheel is further furnished with a screw, $d$, having a conical end, fitting a circumferential groove in the shaft, so as to confine the wheel endwise while it is turning on the shaft as a journal. $e$ represents another radial screw, which may be withdrawn for oiling the journal.

Operation: When the axial screw C is retracted sufficiently to leave the key Z free, the outer surface of the said key will coincide with the periphery of the shaft on which the wheel B is fitted, and will thus allow the said wheel to run freely on the said shaft as a journal, the screw $d$ confining the wheel endwise, and preventing it slipping off. In this condition the wheel, being driven by a band running in its pulley-groove, in customary manner, may be used for driving a needle-sharpener or bobbin-winder, or for any other purpose for which it may be adapted, while the sewing mechanism remains at rest. If it be desired to turn the shaft S so as to work the sewing mechanism, the screw C is turned in. Its conical end bears against the inclined back of the key Z, forcing the other portion of the inclined back of the key against the inclined end of its recess in the shaft, causing the key to be driven radially outward with any necessary force, so as to securely lock the wheel to its shaft. It will thus be observed that the operation of locking the wheel to its shaft or unlocking it therefrom is the work of an instant, and is readily performed by the user of the sewing-machine by means of a slight rotary movement of the screw C.

Having thus described my invention, the following is what I claim as new and desire to secure by Letters Patent:

The combination, with the shaft S and wheel or pulley B, of the loose journal segment or key Z and screw C, adapted to press the said key outward against the wheel, as and for the purpose set forth.

ROSWELL H. ST. JOHN.

Witnesses:
 E. W. MULLIKEN,
 BRUCE MOFFAT.